No. 773,996. PATENTED NOV. 1, 1904.
A. K. SHOOP.
COMBINED SQUARE AND PLUMB BOB.
APPLICATION FILED FEB. 18, 1904.
NO MODEL.

Witnesses:
H. H. Clement
K. H. Butler

Inventor
A. K. Shoop,
By N. C. Evert & Co.
Attorneys.

No. 773,996.

Patented November 1, 1904.

UNITED STATES PATENT OFFICE.

ARTHUR K. SHOOP, OF MANORVILLE, PENNSYLVANIA.

COMBINED SQUARE AND PLUMB-BOB.

SPECIFICATION forming part of Letters Patent No. 773,996, dated November 1, 1904.

Application filed February 18, 1904. Serial No. 194,128. (No model.)

*To all whom it may concern:*

Be it known that I, ARTHUR K. SHOOP, a citizen of the United States of America, residing at Manorville, in the county of Armstrong and State of Pennsylvania, have invented certain new and useful Improvements in a Combined Square and Plumb-Bob, of which the following is a specification, reference being had therein to the accompanying drawings.

This invention has relation to combined squares and plumb-bobs, and has for its object the provision of means for ascertaining whether a vertical or horizontal surface—such as a wall, floor, or other surface—is truly vertical or truly horizontal, and has for its further object the provision of means for determining the degree of variation from a vertical or horizontal line of such surface.

The invention has for its further object the provision of a combined square and plumb-bob which may be employed to ascertain whether a vertical surface on the right-hand side of a horizontal surface is at a true right angle to said horizontal surface and also to ascertain whether a vertical surface on the left-hand side of the horizontal surface is at a true right angle thereto.

This invention has for its further object the provision of means for determining the amount of variation from a horizontal or vertical line of a surface to which it may be applied, and has for its still further object the provision of means for squaring intersecting lines or surfaces on a horizontal plane and for measuring the length of the same.

The invention consists in the novel construction, combination, and arrangement of parts to be hereinafter described and claimed.

Figure 1:
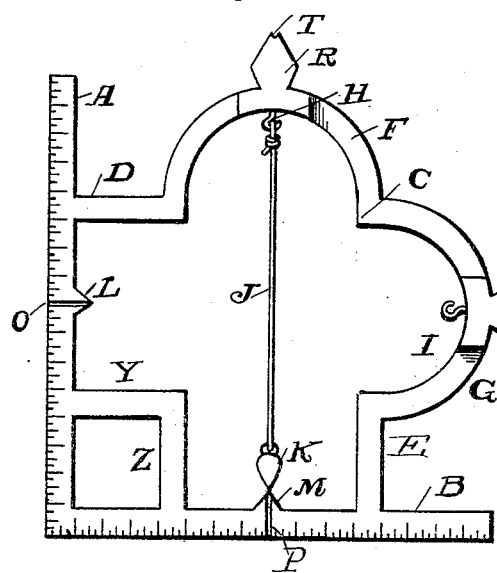
Figure 2:
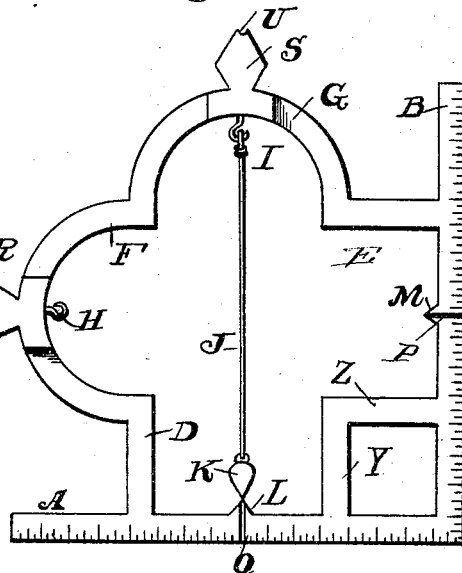
Figure 3:
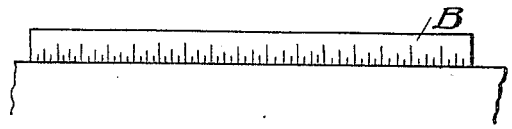
Figures 4, 5:
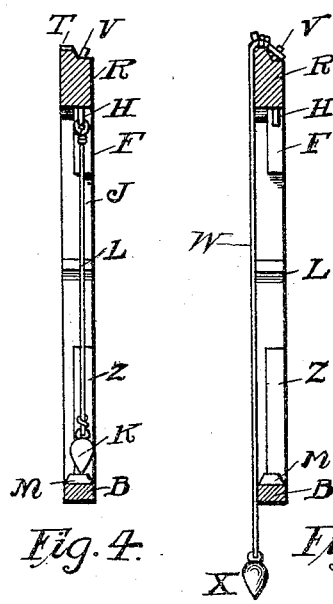

In the accompanying drawings, Figure 1 is a front elevation of my improvements in one position. Fig. 2 is a similar view of the same in another position. Fig. 3 is an edge view. Fig. 4 is a vertical sectional view, and Fig. 5 is a vertical sectional view of a modified form.

In the drawings I have shown in Fig. 1 my improved square and plumb-bob in position against a vertical surface on the left-hand side of a horizontal plane. In Fig. 2 I have shown the same in position against the vertical surface on the right-hand side of a horizontal plane. In Fig. 3 the square is shown lying flat on a horizontal surface.

The square is preferably a single integral casting of metal and is composed of two arms A and B, disposed at right angles one to the other, and the curved bracket C, which extends from one arm, A, to the other arm, B, in the manner shown, the said bracket being composed of the straight sections D and E and the semicircular sections F and G, all preferably formed integral with the arms A and B. The semicircular sections F and G have hooks H and I arranged centrally of their inner sides, these hooks being intended to serve as attaching means for the cord J of the plumb-bob K. The arms A and B are formed with inwardly-extending sharp-edged projections L M, and grooves O P are formed on the outer surface of the arms A and B in vertical alinement with the centers of the projections L and M. Above the outer edges of the semicircular portions F and G of the brackets are ears R S, which are notched at T U, and in the rear of these ears are pins V, adapted to receive the loop of the cord W, which rests in one of the notches T U when the device is in use and carries at its lower end the plumb-bob X, the cord W and plumb-bob X being shown in the modification Fig. 5 and being adapted to be used in lieu of the plumb-bob K and its cord J when the device is employed to determine the degree of variation from a true horizontal or vertical plane of the surfaces to which the device may be applied.

In practice when it is desired to square a vertical surface on the left-hand side of a horizontal plane the cord J is attached to the hook H and plumb-bob K will, if the vertical surface is at a true right angle to the horizontal plane, rest directly over the sharpened edge of the projection M. When it is desired to square a vertical surface on the right-hand side of a horizontal plane, the cord J is attached to the hook I and the plumb-bob will then, if the vertical surface is at a true right angle to the horizontal plane, hang directly over the projection L, it being understood that when using the square in this position the square is turned around so that the arm A rests on a horizontal surface and the arm B bears against the vertical surface. It will also be understood that the device can be used in the aforesaid manner and in either of the positions described to square a wall without resting the horizontal arm upon a horizontal surface.

When it is desired to use the device to determine the amount of variation of a vertical or horizontal surface from a true vertical or horizontal line, the cord J and plumb-bob K are removed and the cord W and plumb-bob X substituted therefor. Under the last-named arrangement the cord W will depend in front of one of the slots O or P if the surface be truly horizontal or vertical, or if such surface deviates from a horizontal or vertical line the cord W will hang in front of the scale of the arm which is in the horizontal position, and by a simple computation the degree of variation from the horizontal or vertical line can be easily determined.

The arms A and B are marked in the manner of a rule, as shown. The edges of the arms A and B are also marked in the manner of a scale and the device may be used to square the surface on a horizontal plane or to measure the same by applying it in position, as shown in Fig. 3, the plumb-bob being removed when it is used in this position. If desired, the arms A and B may be united and braced by connecting-arms Y Z, arranged within the bracket C.

Having fully described my invention, what I claim as new, and desire to secure by Letters Patent, is—

1. A square composed of two arms disposed at right angles to one another, each arm being graduated, a bracket connecting the two arms, a detachable plumb-line and plumb-bob, two attaching devices on the bracket, one opposite each of said arms, and means on each of said arms, opposite each attaching device, for indicating when the plumb-line is at right angles to the arm which is in horizontal position.

2. The combination with a square having two arms arranged at right angles one to the other and each provided with a projection, of a bracket connecting the arms, a plumb-bob and cord, and attaching means carried by the bracket and opposite to each projection on the said arms.

3. The combination with a square having two arms each formed with a scale on its outer side, of a bracket having notched ears at its outer side, means for attaching a cord to the bracket at the rear of each of said ears, a cord adapted to be attached to the bracket and extending from the notch in the ear to below one of said arms, and a plumb-bob attached to said cord.

In testimony whereof I affix my signature in the presence of two witnesses.

ARTHUR K. SHOOP.

Witnesses:
H. C. EVERT,
E. E. POTTER